United States Patent
Ezell (10) Patent No.: US 9,282,489 B2
(45) Date of Patent: *Mar. 8, 2016

(54) MEDIA ESCALATION WITH USE OF ENDPOINT ADAPTER

(71) Applicant: Avaya Inc., Basking Ridge, NJ (US)

(72) Inventor: Joel M. Ezell, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/897,349

(22) Filed: May 17, 2013

(65) Prior Publication Data

US 2014/0341183 A1    Nov. 20, 2014

(51) Int. Cl.
*H04W 4/00* (2009.01)
*H04W 36/00* (2009.01)

(52) U.S. Cl.
CPC .................................. *H04W 36/0022* (2013.01)

(58) Field of Classification Search
CPC .................................................. H04W 36/0022
USPC .................................................. 370/353–493
See application file for complete search history.

(56) References Cited

U.S. PATENT DOCUMENTS

| 7,269,160 | B1 | 9/2007 | Friedman et al. |
| 7,486,949 | B2 | 2/2009 | Ignatin |
| 8,644,817 | B1 | 2/2014 | Ezell et al. |
| 8,910,245 | B2 | 12/2014 | Kondamuru et al. |
| 2003/0032456 | A1 | 2/2003 | Mumick et al. |
| 2004/0081159 | A1* | 4/2004 | Pan et al. ............ 370/395.2 |
| 2005/0282541 | A1* | 12/2005 | Iizuka et al. ........... 455/426.2 |
| 2006/0089169 | A1 | 4/2006 | Tsao et al. |
| 2007/0140157 | A1 | 6/2007 | Fu et al. |
| 2008/0052377 | A1 | 2/2008 | Light |
| 2008/0084859 | A1 | 4/2008 | Sullivan |
| 2009/0003316 | A1* | 1/2009 | Lee et al. .................. 370/352 |
| 2009/0111472 | A1 | 4/2009 | Promenzio et al. |
| 2010/0031335 | A1 | 2/2010 | Handler |
| 2010/0105379 | A1 | 4/2010 | Bonner et al. |
| 2011/0289203 | A1 | 11/2011 | Braudes et al. |
| 2011/0289219 | A1 | 11/2011 | Braudes et al. |
| 2013/0303007 | A1 | 11/2013 | Kim et al. |
| 2014/0126714 | A1 | 5/2014 | Sayko |
| 2014/0280987 | A1 | 9/2014 | Ezell |
| 2014/0280995 | A1 | 9/2014 | Ezell |

FOREIGN PATENT DOCUMENTS

EP    2220815    8/2010
EP    2299675    3/2011

(Continued)

OTHER PUBLICATIONS

Official Action with English Translation for Korea Patent Application No. 2013-0075771, dated Apr. 23, 2014 8 pages.

(Continued)

*Primary Examiner* — Iqbal Zaidi
(74) *Attorney, Agent, or Firm* — Sheridan Ross P.C.

(57) ABSTRACT

An endpoint adaptor and methods of operating the same are provided. The endpoint adaptor provides a single persistent view of a mobile communication device to a network and network-based applications. Moreover, the ability to leverage the endpoint adapter to transition a communication session to include additional media types while the communication session is in-progress is also disclosed.

20 Claims, 4 Drawing Sheets

(56) References Cited

FOREIGN PATENT DOCUMENTS

| | | |
|---|---|---|
| KR | 10-2005-0092615 | 9/2005 |
| KR | 10-2006-0082127 | 7/2006 |
| KR | 10-2007-0027427 | 3/2007 |
| WO | WO 2014/060008 | 4/2014 |

OTHER PUBLICATIONS

Notice of Allowance with English Translation for Korea Patent Application No. 10-2013-0075771, mailed Jul. 23, 2014 3 pages.

Combined Search and Examination Report for United Kingdom Patent Application No. GB1322999.2, dated Jul. 4, 2014 6.

Official Action for U.S. Appl. No. 13/627,750, mailed Dec. 10, 2012 19 pages.

Official Action for U.S. Appl. No. 13/627,750, mailed Apr. 25, 2013 24 pages.

Notice of Allowance for U.S. Appl. No. 13/627,750, mailed Sep. 18, 2013 13 pages.

Combined Search and Examination Report for United Kingdom Patent Application No. GB1512416.7, dated Sep. 1, 2015, 5 pages.

Official Action for U.S. Appl. No. 14/054,275, mailed Dec. 2, 2015, 4 pages.

Official Action for U.S. Appl. No. 14/054,286, mailed Dec. 10, 2015, 4 pages.

* cited by examiner

MEDIA ESCALATION WITH USE OF ENDPOINT ADAPTER

FIELD OF THE DISCLOSURE

The present disclosure is generally directed toward communications and more specifically directed toward mobile communications.

BACKGROUND

People increasingly desire multi-media communications from their mobile devices. While smartphones enable many types of multi-media communications, the ability to effectively deploy such capabilities often depends upon the network type available to the mobile device. For instance, when a mobile device is only connected to a cellular network, it may be impossible and/or cost-prohibitive to implement a video call or simultaneously conduct multiple different communication sessions via different media types.

SUMMARY

It is with respect to the above issues and other problems that the embodiments presented herein were contemplated.

Fixed mobile convergence (FMC) provides a seamless service using a combination of fixed broadband and local access wireless technologies. FMC essentially tries to enable a user to seamlessly transfer a single communication session from one network to another (referred to as handoff). It has been observed that most handoff techniques are inferior and often result in dropped calls.

A solution to many problems observed with handoff techniques has been developed and is described in U.S. patent application Ser. No. 13/627,750 to Ezell et al., filed Sep. 27, 2012, the entire contents of which are incorporated herein by reference. In the '750 application, an adaptation bridge or SIP Endpoint Adapter (SEA) is described as residing on a network to represent a remote application. The remote application and the adaptation bridge act in concert such that: (1) Native protocols can be used by the mobile application to leverage the full capabilities of the device and network where the adaptation bridge does the mapping and (2) the adaptation bridge can provide the rest of the network a single persistent view of a mobile application even in cases where the mobile application is moving from IP to IP, PSTN to IP, or has no IP connectivity at all.

The SEA was designed to present a persistent registration and network presence to the network for a single SIP contact. The SEA was described as being able to register a single SIP contact that represents both "heads" of the dual mode client, dual mode meaning providing the ability to utilize both cellular and wireless communication networks. That registration appeared as a single device/entity to the network core. This set up a combined mobile identity. The SEA, as part of its functionality, ensures that the appropriate signaling mechanism was alerted based on policies for the registration.

Embodiments of the present disclosure leverage the SFA's functionality to further enhance a mobile user's device experience. Specifically, in accordance with at least some embodiments of the present disclosure, mechanisms for switching a communication session from one media type to another different media type are disclosed. While some embodiments of the present disclosure will be described in connection with performing a "media escalation" (e.g., moving a communication session from a first media that utilizes a first bandwidth to a second media that utilizes a second bandwidth that is larger than the first bandwidth), it should be appreciated that embodiments of the present disclosure are not so limited. Specifically, the features disclosed herein can be utilized to move a communication session from a higher bandwidth media type to a lower bandwidth media type. Moreover, a common media type may be used, but different bandwidths can be accommodated depending upon the conditions. For instance, a video call may be transitioned from a high definition video call to a non-high definition video call, or vice versa.

In accordance with at least some embodiments, imagine the following, non-limiting, use case:

User A is on a call on a mobile GSM network using a dual-mode smartphone client.

At some point during the call, User A indicates that they want to escalate the call to a video call (still the same call with the same person on the far end). In other words, User A wants to add a new media type to the in-progress communication session. This indication may occur while User A is still only connected to the mobile GSM network or it may occur after the user gets to a location where the smartphone is allowed to connect to another network, such as a Wi-Fi network. If the indication for escalation occurs before User A gets to a new location, the escalation may be delayed unless and until the smartphone detects a new, and potentially proper, network. Once such a network is detected or if User A provides the instruction to escalate the call while in the presence of the Wi-Fi network, the smartphone begins trying to escalate the call.

Once connected to the appropriate network, the smartphone begins the process of escalating the call (e.g., adding the new media type) by registering its SIP aspect of the dual-mode client with a network backend via the endpoint adapter. Once registered with a network backend, the SIP aspect of the dual-mode client takes over the communication session and the call is escalated to video seamlessly.

During the above process, the endpoint adapter in the network backend makes the calls (voice and then video) appear like a single SIP call to the rest of the network, by sending a re-INVITE to add video to the original voice call, for example. One significant advantage of making the two different calls appear like a single SIP call is that the user's call log is kept clean (i.e., there will not be two instances of the call in the user's call log). Moreover, since the call appears like a single call, there is no effort by the network to invoke additional network resources to support the escalated call since the resources from the original call can be connected seamlessly to the escalated call due to their singular view of the call.

While the use case described above relates to the escalation of a voice call to a video call, it should be appreciated that these concepts could also apply to other media types or different types of session escalation (e.g., text to voice escalation, single media type to multi-media, etc.) or different types of session de-escalation (e.g., voice to text, video to voice, high quality voice to lower quality voice, etc.).

Another aspect of the present disclosure is to enable a rules engine in the dual-mode smartphone to automatically switch calls to other media types when the smartphone detects that it has switched between networks of different capabilities. It is easier for the smartphone to take control over this switching (escalation/de-escalation) because the network treats its call as a single call rather than two different calls to each component of the smartphone.

Thus, it is an aspect of the present disclosure to provide an endpoint adapter configured to support the switching of a communication session from one media type to another media type, where the switching can occur automatically (e.g., without user input) in response to moving from one network to another network.

In accordance with at least some embodiments of the present disclosure, a method is provided which generally comprises:

enabling a first user to engage in a communication session with a second user via a first medium, the first user utilizing a first communication device for the communication session;

determining that the first user has moved from a first network to a second different network; and in response to determining that the first user has moved to the second network, adding a second medium to the communication session.

In some embodiments, the first communication device may comprise a dual-mode client which includes a first client and a second client. Moreover, the first client may facilitate the communication session via the first medium by registering with an enterprise network backend through an endpoint adapter. In some embodiments, the first client would often be the primary GSM phone capability on a smartphone. In such a case, the first client may not actually register with the enterprise. Instead it is administratively associated with the enterprise infrastructure.

Further still, the second medium may be added to the communication session through the operation of the second client. In some embodiments, the first and second clients may both register with the enterprise network backend through the same endpoint adapter, one of the clients may be responsible for providing one of the mediums while the other of the clients may be responsible for providing another of the mediums. Because both clients may be registered with the same endpoint adapter, the now multi-media communication session may still appear as a single unified communication session to a network backend as well as other devices connected to the network backend, whether internal or external.

As used herein, the term "register" and "registration" may include the concept of having a module automatically or with the assistance of user input register with an endpoint adapter. The term register or registration may alternatively or additionally include an administered association where a user or system administrator "registers" a client with an endpoint adapter by manual provisioning directly with the endpoint adapter or through an interface of the endpoint adapter. In other words, the term "register" or "registration" should not be restricted to situations where the client actively seeks registration with the endpoint adapter when a network is available. Instead, the registration may occur at the endpoint adapter via input from a user or administrator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
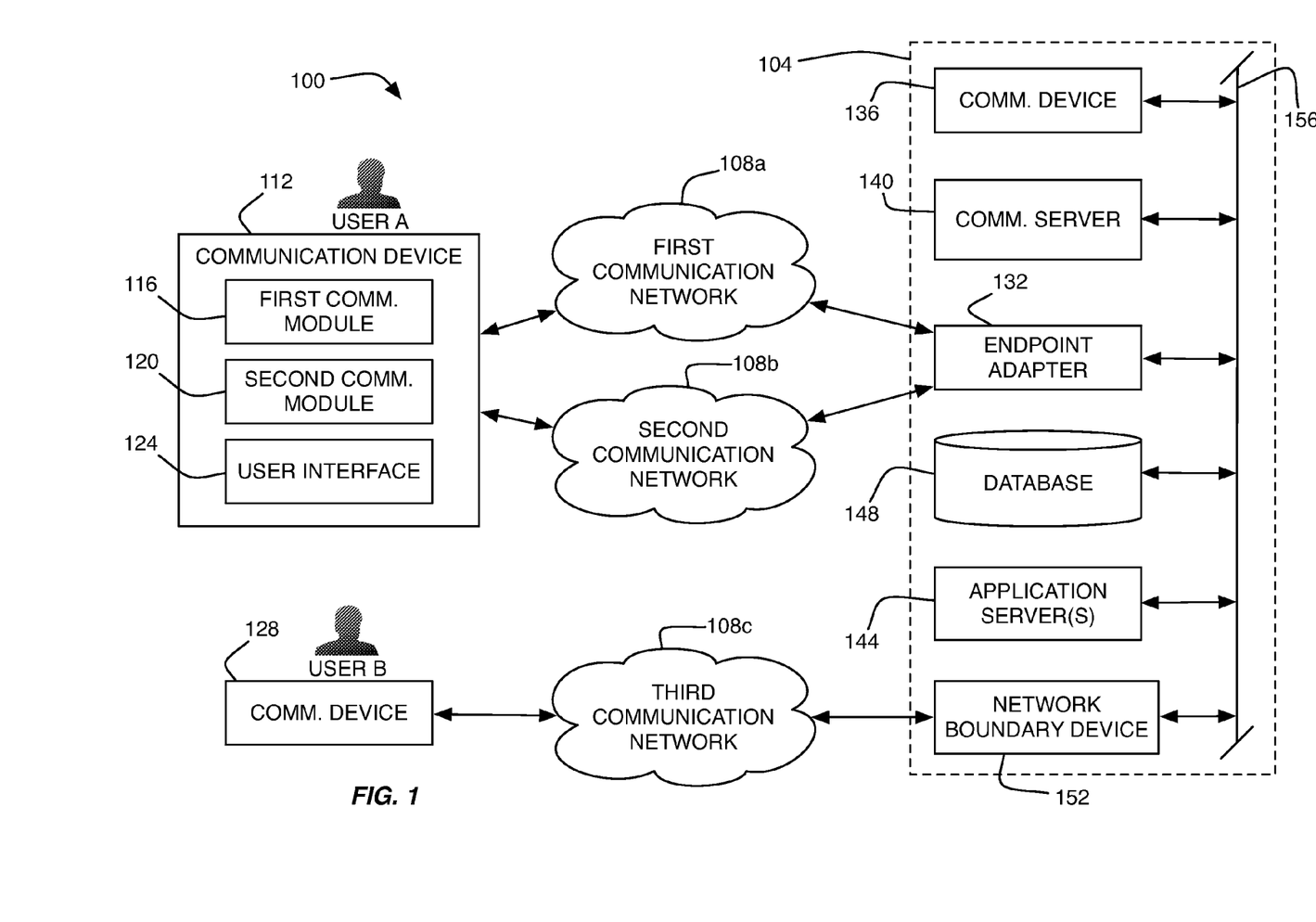
FIG. 1 is a block diagram of a communication system in accordance with embodiments of the present disclosure.

FIG. 1 shows an illustrative embodiment of an illustrative communication system 100 in accordance with at least some embodiments of the present disclosure. The communication system 100, as depicted, includes an enterprise communication network 104 that is configured to communication with communication devices 112, 128 outside of the enterprise network 104 via one or more distributed communication networks 108a-c. In the depicted embodiment, the enterprise network 104 is configured to exchange communications with a multi-client communication device 112 via a first communication network 108a and a second communication network 108b. Moreover, the enterprise network 104 is configured to exchange communication with another communication device 128, which may or may not be a multi-client communication device, via a third communication network 108c Although FIG. 1 depicts the communication system 100 as comprising three different communication networks 108a-c, it should be appreciated that a greater or lesser number of networks may be utilized without departing from the scope of the present disclosure. For instance, the second communication network 108b may correspond to a same type of network as the third communication network 108c. As an even more specific example, the second and third communication networks 108b, 108c may actually be the same network.

The communication device 112, in some embodiments, corresponds to a mobile communication device such as a cellular phone, smart phone, laptop, tablet, Personal Digital Assistant (PDA), or combinations thereof. Moreover, the communication device 112 may include any collection of components that enable the user to exchange media (e.g., voice, video, etc.), data (e.g., emails, Short Message Service (SMS) messages, Multimedia Message Service (MMS) messages, files, presentations, documents, etc.), and other forms of communications with other communication devices 128 and/or 136. The communication device 112 may be configured to be carried and used by a user to have communication sessions with other users via their respective communication devices, which can be provided within 136 or external 128 to the enterprise communication network 104.

The other communication devices 128, 136 may also correspond to communication devices capable of exchanging media over the communication networks. The other communication devices 128, 136 may correspond to mobile communication devices, hardwired communication devices, softphones, PCs, laptops, smart phones, PDAs, tablets, hard phones, or the like.

In some embodiments, the enterprise communication network 104 is separated from the third communication network 108c by a network boundary device 152. The network boundary device 152 may correspond to a logical or physical separation between the networks. In some embodiments, the network boundary device 152 may comprise one or more devices that insulate the enterprise network 104 from the third communication network 108c. Although not depicted, a network boundary device may also separate the enterprise network 104 from one or both of the first and second communication network 108a, 108b. Such a network boundary device may reside between the communication networks and the endpoint adapter 132, the endpoint adapter may comprise functionality of the network boundary device, or the network boundary device may reside behind the endpoint adapter 132, thereby enabling the endpoint adapter 132 to present both clients of the communication device 112 to the network boundary device as a single device.

In some embodiments, a network boundary device may comprise one or more of a firewall, Session Border Controller (SBC), gateway, Network Address Translator (NAT), or the like and may be provided to establish and maintain security provisions of the enterprise network 104. More specifically, the network boundary device 152 may be utilized because one or more of the other communication networks 108a, 108b, 108c may be untrusted (e.g., the Internet), but the enterprise communication network 104 may be administered by a particular entity or enterprise that has specific communication rules, policies, etc. that are enforced within the enterprise communication network 104. One or more system administrators for the entity may be employed to enforce and maintain the communication rules, policies, etc. within the enterprise communication network 104. As such, the enterprise communication network 104 may be considered "trusted" network whereas some or all of the first, second, and third communication networks 108a, 108b, 108c may be public or "untrusted" networks.

In some embodiments, the enterprise communication network 104 may comprise a locally-administered communication system 156, such as a Local Area Network (LAN), a Wide Area Network (WAN), a SIP network, a Voice over IP (VoIP) network, or the like. Often times, the enterprise communication network 104 and the backbone 156 thereof employs one or more protocols that are specific to that network (e.g., not used by the first, second, or third communication networks 108a, 108b, 108c).

In some embodiments, the endpoint adapter 132 is provided to present a single persistent view of the communication device 112 to every device connected to the backbone 156. More specifically, the endpoint adapter 132 is configured to present each communication module 116, 120 within the communication device 112 as a single entity, even though each module 116, 120 is a different and distinct application residing within the communication device 112. Accordingly, the components of the enterprise communication network 104 can provide services to both the first and second modules 116, 120 of the communication device 112 without knowing that both modules 116, 120 are distinct.

In some embodiments, the enterprise communication network 104 may be capable of providing rich communication features and functions to communication devices inside the network 136 as well as communication devices outside the network 112. Examples of the types of rich communication features that may be provided by the enterprise communication network 104 include, without limitation, presence features, extension-to-cellular features, enhanced media features, advanced call routing features, conferencing features, call recording features, security features (e.g., encryption), collaboration features, voicemail, media conversion features (e.g., text-to-speech, speech-to-text, etc.), combinations thereof, and the like.

These rich communication features provided by the enterprise communication network 104 may be provided by the concerted efforts of the application server(s) 144, communication server 140, and/or databases 148 (e.g., hierarchical database, such as a SQL database, or a no-SQL database). In some embodiments, the application server(s) 144 may correspond to one or more of a Back-to-Back User Agent (B2BUA) or proxy server that is configured to be included in a communication session for or on behalf of a user by a communication server 140. When an enterprise user makes or receives a call within the enterprise network 104, the communication server 140 may be configured to determine and implement communication preferences for the calling and/or called user. In some embodiments, the call preferences may be implemented by sequencing one or more applications from an application server 144 into a signaling and/or media path between the communication devices.

Additional details of possible behaviors and rich communication features that may be provided by the enterprise communication network 104 are described in U.S. Patent Publication Nos. 2011/0289219 and 2011/0289203, each of which are hereby incorporated herein by reference.

As noted above, the endpoint adapter 132 may be configured to simultaneously maintain registration information for the first communication module 116 and second communication module 120 of the communication device 112. In some embodiments, the first communication module 116 may register with the endpoint adapter 132 using a first addressing schema and the second communication module 120 may register with the endpoint adapter 132 using a second addressing schema that is different from the first addressing schema. As mentioned above, the first communication module 116 may correspond to a first application stored on the communication device 112 that interfaces with the endpoint adapter 132 using a first communication protocol whereas the second communication module 120 may correspond to a second application stored on the communication device 112 that interfaces with the endpoint adapter 132 using a second communication protocol.

More specifically, the addressing schema used by the communication modules may depend upon the nature of the communication network with which the endpoint adapter 136 connects with the communication module. As some non-limiting examples, the first communication network 108a may correspond to a PSTN, cellular, or similar type of network whereas the second communication network 108b may correspond to a data network (e.g., SIP network, IP network, VoIP network, etc.). Continuing the above example, the first communication module 116 may register with the endpoint adapter 132 using a phone number or any other addressing schema supported by the first communication network 108a whereas the second communication module 120 may register with the endpoint adapter 132 using an IP address, SIP address, or any other addressing schema supported by the second communication network 108b.

Still continuing the above example, the second communication module 120, since it is using a data network, may correspond to a SIP endpoint, SIP User Agent (UA) (e.g., a SIP UA in the form of a smartphone application), and/or a thin client browser operating on the communication device 112. Where the second communication module 120 corresponds to a thin client browser, the endpoint adapter 132 may be further equipped with an Hyper Text Markup Language (HTML) extension or module that enables the endpoint adapter 132 to present one or more html-type files (e.g., webpages pages or other information that can be displayed in a web browser). In some embodiments, the HTML extension may facilitate a WebRTC communication session between the communication device 112 and another communication device. The browser on the communication device 112 may use an IP address and that IP address may correspond to the IP address provided to the endpoint adapter 132 for registration. Where the second communication module 120 corresponds to a SIP endpoint or SIP UA, the second communication module 120 may register with the endpoint adapter 132 using a SIP address or the like.

The first communication module 116, on the other hand, at least one of (i) registers with the endpoint adapter 132 using the phone number or the like and (ii) has a provisioned association with the endpoint adapter 132. The first communication module 116 enables the communication device 112 to exchange messages with the endpoint adapter 132 via the first communication network 108a whereas the second communication module 120 enables the communication device 112 to exchange messages with the endpoint adapter 132 via the second communication network 108b.

In some embodiments, the first communication module 116 may be utilized to support media of a first type (e.g., voice, text, etc.) for a communication session. When the communication device 112 moves within communication proximity of the second communication network 108b, the second communication module 120 may be invoked to add a second media type (e.g., voice, video, data, etc.) to the in-progress communication session that was currently being facilitated by the first communication module 116. In some embodiments, the addition of the second media type may enable the user to transition the in-progress communication session to a richer media experience. The addition of the second media type may occur with the simultaneous operation of the first and second communication modules 116, 120 or the in-progress communication session may be handed off from the first communication module 116 to the second communication module 120. Moreover, the presentation of the communication session may be provided to the user via a user interface 124 of the communication device 112. The presentation of the communication session may change to show the addition of the new media type (e.g., via the second communication module 120), but otherwise the in-progress communication session is not disturbed or interrupted. Accordingly, the combined operations of the communication modules 116, 120 and the endpoint adapter 132 enable a communication device 112 to quickly and seamlessly escalate a communication session from one media type to a second media type, where the second media type may replace the first media type or complement (e.g., be provided in addition to) the first media type.

In some embodiments, endpoint adapter 132 is allowed to register both sides/modules of the communication device 112 via two different networks, but presents a single view of the device 112 to the enterprise communication network 104 and all devices connected to the network backbone 156. This is possible because both modules 116, 120 of the communication device 112 are allowed to simultaneously register with the endpoint adapter 132.

While embodiments of the communication system 100 have been described in connection with a certain number and type of devices and servers, it should be appreciated that embodiments of the present disclosure are not so limited. In particular, any of the components or devices may be duplicated or combined without departing from the scope of the present disclosure. Furthermore, although the communication device 112 is depicted as only having two communication modules 116, 120, it should be appreciated that a communication device 112 may be equipped with two, three, four, ..., ten, twenty, or more different modules without departing from the scope of the present disclosure. The different communication modules 112 may enable different communication media types and/or communications over different communication networks 108.

Figure 2:
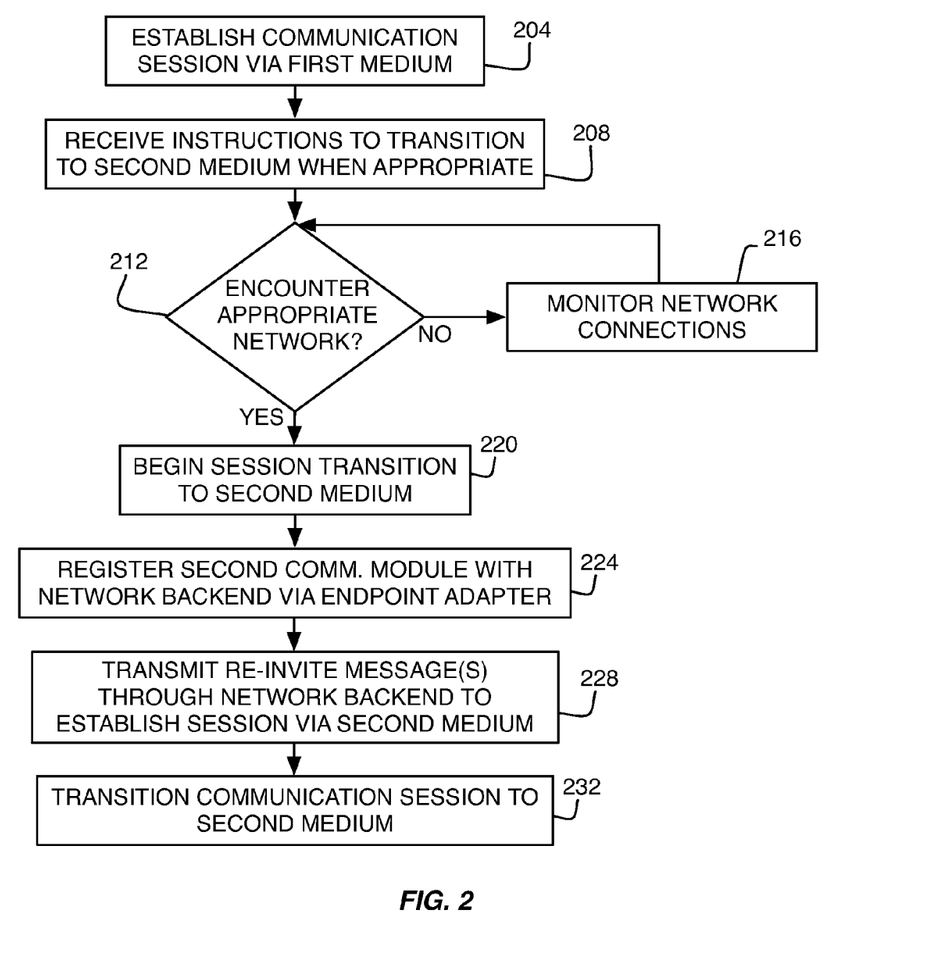
FIG. 2 is a flow diagram of a first communication method in accordance with embodiments of the present disclosure.

With reference now to FIG. 2, an illustrative communication method will be described in accordance with embodiments of the present disclosure. The method begins when the communication device 112 and a user thereof (e.g., user A) establishes a communication session with a second user (e.g., user B) that is using a different communication device (step 204). In some embodiments, the communication session may be established between two communication devices that are outside of the enterprise network 104. For instance, user A may be utilizing the communication device 112 as a mobile device and user B may be utilizing the communication device 128 that is also external to the enterprise network 104. In this scenario, one or both of the users may correspond to enterprise users that are utilizing mobile communication devices that have roamed beyond the boundary of the enterprise network 104. Continuing the above example, if both users are using devices outside of the enterprise network 104, one of the users (e.g., user A) may have their communication device 112 registered with the endpoint adapter 132 whereas the other user may or may not have their communication device 128 connected to the network 104 via the network boundary device 152.

In another example, user A may be utilizing a mobile communication device 112 that is external to the enterprise network 104 whereas user B may be utilizing a communication device 136 that is internal to the enterprise network 104 (e.g., directly connected to the network backbone 156 without traversing the network boundary device 152). Continuing this example, both user A and user B may correspond to enterprise users and the communication server 140 may sequence one or more applications on behalf of and in accordance with preferences of both users. Again, user A's communication device 112 may be connected to the network backbone 156 via the endpoint adapter 132 whereas user B's communication device 136 may be directly connected (e.g., hardwired) to the network backbone 156.

In some embodiments, the communication session may be facilitated via a first medium (e.g., voice, video, text, etc.). The first medium initially used for the communication session may be dictated by the capabilities of the first communication network 108a. As a non-limiting example, the first communication network 108a may correspond to a PSTN or some other relatively simple communication network that only supports communications over the first medium. In other words, the protocols used for communicating over the first communication network 108a may be limited to a first set of protocols and the devices involved in the communication session may have initially established that the communication session had to utilize the first medium due to the fact that the communication device 112 is only able to access the first communication network 108a.

In some embodiments, the communication session may be initially controlled and enabled by the operation of the first communication module 116. As mentioned above, as part of establishing the first communication session, the first communication module 116 may register with the endpoint adapter 132 and the endpoint adapter 132 may present the identity of the communication device 112 to the network backbone 156 and all devices connected thereto as the target device rather than presenting the first communication module 116 as the target device. In other words, although the first communication module 116 may be registered with the endpoint adapter 132 via a first addressing schema (e.g., PSTN number, cellular number, etc.). The first endpoint adapter 132 may then present an alias describing the first communication device 112 to the rest of the network 104 without necessarily presenting the address used by the first communication module 116 for registration.

The method continues as the communication session continues. In particular, at some point during the communication session, instructions may be received at the communication device 112 to transition the communication session to a second medium when the opportunity presents itself (step 208). Specifically, one or both of user A and user B (or some other user involved in the communication session) may decide that it would be useful to escalate the in-progress communication session to include a new media type or an enhanced version of the first medium. As a non-limiting example, user A may provide some input to the communication device 112 via the user interface 124 indicating a desire to escalate the communication session when possible. As another non-limiting example, user B may send an invitation to user A requesting that a new medium be added to the in-progress communication session. In either event, it may be assumed that the user(s) which provided the instructions to transition the in-progress communication session to a new, additional, or alternative medium may have provided such instructions due to the fact that the first medium is not ideal for the in-progress communication session and the information being shared.

Once the instructions to transition to a second medium are received, the second communication module 120 is activated (e.g., launched, awakened, etc.). Once activated, the second communication module 120 will begin searching for a connection to the second communication network 108b (step 212). Specifically, the second communication module 120 may search for any access point (e.g., cellular tower, Wi-Fi hotspot, router, etc.) until the second communication network 108b is discovered. This searching may be performed continuously or periodically (e.g., every 10 seconds, 1 minute, 10 minutes, etc.) until the second communication network 108b is discovered. In other words, the "discovery" of the second communication network 108b may be predicated upon the communication device 112 being brought within a communication proximity of an access point for the second communication network 108b. The communication proximity of the second network 108b will depend upon the type of network being utilized as the second communication network 108b. For instance, the communication proximity of a cellular network is greater than the communication proximity of a Wi-Fi network, which is greater than the communication proximity of a Bluetooth network.

The second communication module 120 will continue searching and monitoring for the second communication network 108b until it has found the second communication network 108 or until the communication session has ended (loop of steps 212 and 216). Once the second communication module 120 discovers the second communication network 108b, the second communication module 120 may begin the process of automatically adding a second medium to the in-progress communication session per the instructions of the user(s) involved in the session (step 220).

As discussed above, there are a multitude of examples for the way in which a communication session can be transitioned or have a second media type added to the in-progress communication session to either supplement the first medium or supplant the first medium. The first step in transitioning/adding the second medium may involve the second communication module 120 identifying a location or address of the endpoint adapter 132 and then the second communication module 120 may register with the network backend 156 via the endpoint adapter 132 (step 224). In some embodiments, the second communication module 120 may register with the endpoint adapter 132 via a second addressing schema (e.g., IP address, SIP address, etc.) that facilitates communications over the second communication network 108b.

Once registered with the endpoint adapter 132, the endpoint adapter 132 may begin the process of using the second communication module 120 and the second communication network 108b to add media (e.g., a second media type that is transmitted via a second medium, such as video) to the communication session currently in progress between the endpoint adapter 132 and the first communication module 116. Specifically, the endpoint adapter may transmit one or more re-INVITE messages through the network backend 156 to each device involved in the in-progress communication session (e.g., communication servers 140, application server(s)

144, any other B2BUA sequenced into the signaling path for the in-progress communication session, database interfaces, the network boundary device 152, and the like) (step 228). The endpoint adapter 132 transmits the re-INVITEs to the devices involved in the in-progress communication session to let them know that a new media type is being added to the session, but all devices continue to address their communications as before (e.g., because the endpoint adapter 132 presents the different communication modules 116, 120 as a single entity to the network 104).

After each device involved in the in-progress communication session has received and properly processed the re-INVITE message(s) transmitted by the endpoint adapter 132, the method continues with the in-progress communication session transitioning to use the second media type (step 232). As can be appreciated, the second media type may be used in lieu of or in addition to the first media type that was originally used for the communication session. Moreover, because the endpoint adapter 132 has presented the transition as a continuation of the in-progress communication session, no additional resources are utilized (unless additional resources were needed to support the new media type). Otherwise, the network configuration before the transition of the communication session is the same as the network configuration after the transition of the communication session. The only difference is that the in-progress communication session is allowed to enjoy a richer media experience thanks to the second communication network 108b and the second communication module 120. It should be appreciated that after the communication session has transitioned as per step 232, the second communication module 120 may be solely responsible for facilitating the communication session or the first and second communication modules 116, 120 may act in concert and cooperatively so as to combine the different media types for presentation to the user via the user interface 124.

Figure 3:
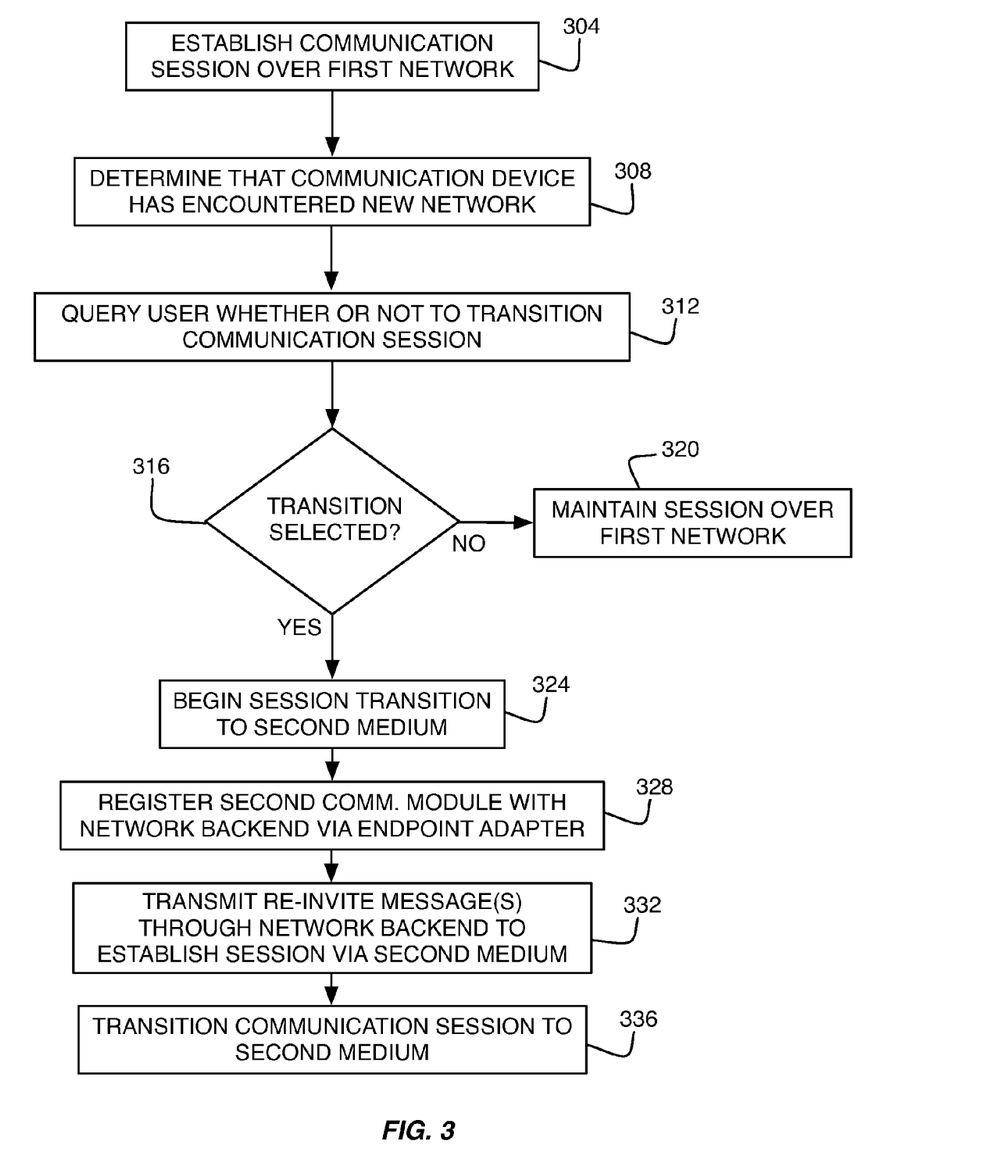
FIG. 3 is a flow diagram of a second communication method in accordance with embodiments of the present disclosure.

With reference now to FIG. 3, a second communication method will be described in accordance with at least some embodiments of the present disclosure. The method begins similar to the method described in FIG. 2, whereby a first communication session is established over the first communication network 108a and a first media type is used to exchange information during the communication session (step 304). In some embodiments, the communication session may initially be facilitated by the operation of the first communication module 116 and the first communication network 108a. In some embodiments, it may either be impossible or cost prohibitive to include a second media type in the communication session while the first communication network 108a is being used.

Because the communication device 112 may be mobile, however, the method continues when the communication device 112 or some component thereof (e.g., the first communication module 116, the second communication module 120, etc.) detects that the communication device 112 is within communication proximity of a new network (e.g., the second network 108b) (step 308). This detection may occur in response to the second communication module 120 detecting a pinging or alerting message from a device of the second communication network 108b. In other words, the communication device 112 or one of its components may passively detect a new network. In other embodiments, the communication device or one of its components may be configured to actively search for the second communication network 108b. For example, the second communication module 120 may be configured to periodically search for a communication signal from an access point of the second communication network 108b.

Once the communication device 112 has detected the new communication network, the method continues with the communication device 112 and perhaps the second communication module 120 preparing and providing a query to the user of the communication device 112 (e.g., user A) asking whether or not the user would like to transition the in-progress communication session to include a new media type, switch to a richer version of the media already being used (e.g., use an improved audio and/or video codec), or the like (step 312). In some embodiments, the second communication module 120 may prepare and present a query to the user via the user interface 124 which informs the user that a new network has been detected and asks whether the user would like to add a new media type to an in-progress communication session being conducted via the first communication module 116. The query may be presented graphically via a graphical user interface 1245, audibly via an audio menu or query, and/or by some tactile alerting mechanism, such as vibrating.

The communication device 112 or the component responsible for generating the query (e.g., the second communication module 120) may wait to determine if the user has selected to transition the in-progress communication session (step 316). If the query of step 316 is answered negatively or if the query is not responded-to within a predetermined amount of time or before a predetermined event, then the method may continue by keeping the in-progress communication session on the first communication network 108a and the first communication module 116 may continue to facilitate the communication session (step 320).

If, however, a positive response is received from the user with respect to the query of step 316, then the method begins by initiating a sequence whereby the in-progress communication session is transitioned to the second communication network 108b so that a second media type can be added to the session (step 324). The details and steps of implementing such a transition (e.g., via the use of a re-INVITE message) may be similar or identical to the transition steps described in connection with FIG. 2. Specifically, as a non-limiting example, steps 328, 332, 336 may correspond similarly or identically to steps 224, 228, and 232, respectively, in that the new media type may be added by invoking the second communication module 120 and enabling media for the communication session to flow between the second communication module 120 and the endpoint adapter 132 via the second communication network 108b. Of course, the media may travel to the far-end communication device, which may be inside the enterprise or outside the enterprise, in which case the media may traverse the network boundary device 152 and the third communication network 108c on its way to the communication device 128.

Figure 4:
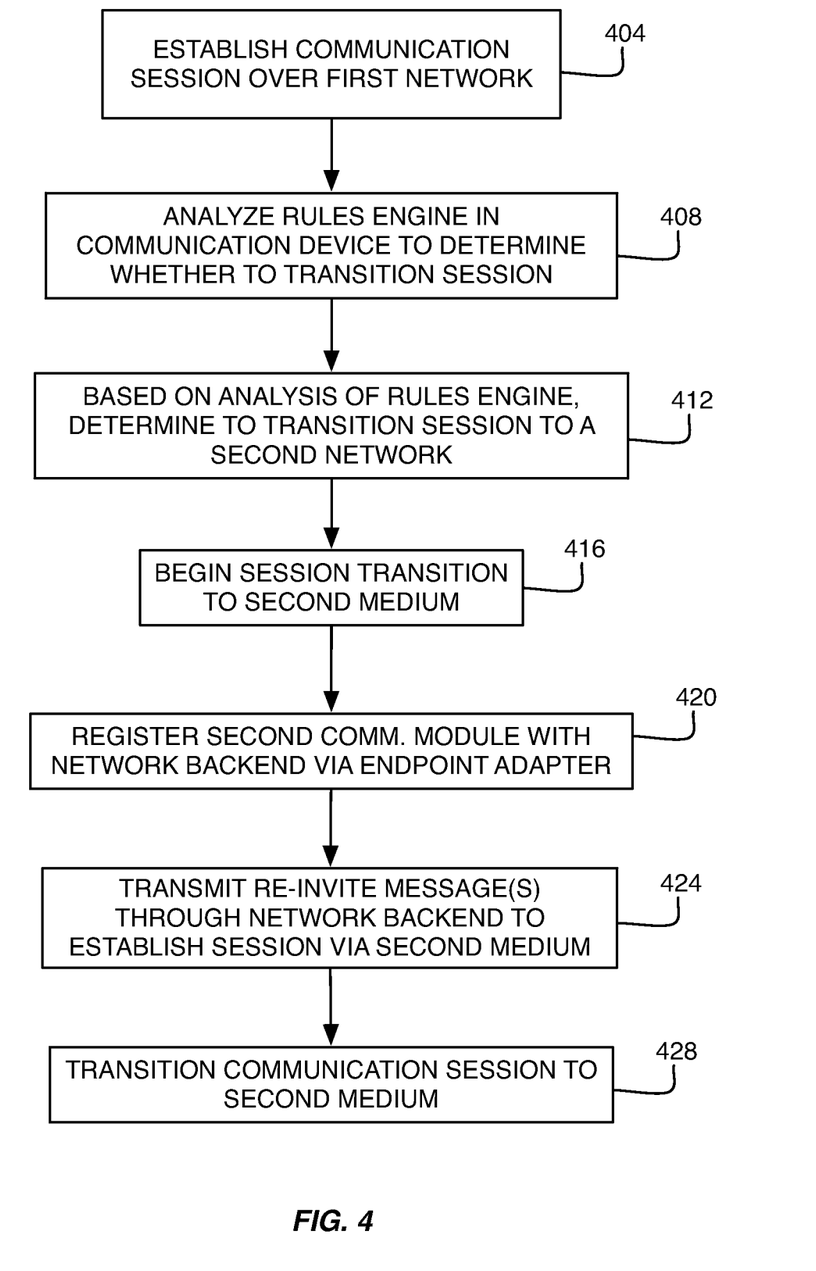
FIG. 4 is a flow diagram of a third communication method in accordance with embodiments of the present disclosure.

With reference now to FIG. 4, yet another communication method will be described in accordance with embodiments of the present disclosure. The method begins with the establishment of a communication session over the first communication network 108a with the first communication module 116 (step 404). In some embodiments, the first communication network 108a may be configured to facilitate communication sessions via a first media type, but not a second media type. The inability to include a second media type in the communication session established over the first communication network 108a may be due to the lack of capabilities of the network itself or due to the cost-prohibitive nature (as per the user's preferences) of utilizing the second media type over the first communication network 108a.

The method continues with the communication device 112 or a component thereof (e.g., the first communication module 116 or second communication module 120) analyzing one or more rules in a rules engine to determine whether the communication session should be transitioned to include a new media type (step 408). In some embodiments, the rules engine may correspond to one or more rules that are locally stored in memory of the communication device and the one or more rules may define conditions or triggers that, if satisfied, cause the communication device to begin a process of transitioning an in-progress communication session to include a new media type. Advantageously, the rules engine may be administered prior to the in-progress communication session beginning in accordance with communication preferences for user A. Thus, once user A begins a communication session with the first communication module 116 over the first communication network 108a, the communication device 112 can automatically transition the communication session in accordance with user A's preferences without interrupting user A during the in-progress communication session. For instance, the rules engine may comprise one or more rules that cause the in-progress communication session to be transitioned to include a new media type if the communication device 112 enters a predefined location (e.g., an office, a shared office, a conference room, etc.), if the communication device 112 moves from one predetermined location to another predetermined location, if the user of the communication device opens a predetermined application other than the first and second communication modules 116, 120 (e.g., user A opens a presentation application, a video application, etc.), or the like.

Any combination of conditions can be defined within the rules engine to enable the user to automatically (e.g., without user input during the in-progress communication session) transition a communication session to include a new media type. Based on the analysis of the rules engine, the communication device 112 or a component thereof may make the automatic determination as to whether or not to transition the in-progress communication session (step 412). This analysis may occur periodically or on a continuous basis.

Once the communication device 112 or a component thereof detects one or more conditions that satisfy the one or more rules in the rules engine, the method continues with the communication device 112 automatically beginning the process of transitioning the communication session to include the second media type (step 416). In particular, additional steps of registering (step 420), transmitting one or more re-INVITE message (step 424), and finalizing the transition (step 428) may be performed similar to the other transitioning processes described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
registering, by a processor, a first communication module of a communication device with an endpoint adapter, the first communication module registering with the endpoint adapter via a first communication network that uses a first addressing schema to contact the communication device;
enabling, by the processor, a communication session to occur while the first communication module is registered with the endpoint adapter, the communication session utilizing a first media type that is supported by the first communication network;
registering, by the processor, a second communication module of the communication device with the endpoint adapter, the second communication module registering with the endpoint adapter via a second communication network that uses a second addressing schema to contact the communication device;
after the second communication module has registered with the endpoint adapter, utilizing, by the processor, the second communication module to add a second media type to the communication session while the communication session is in-progress, wherein the second media type comprises a media type not supported by the first communication network, wherein the communication session is initiated when the communication device is within communication proximity of the first communication network and not within communication proximity of the second communication network;

determining, by the processor, that the communication device has moved within communication proximity of the second communication network; and after determining that the communication device has moved within communication proximity of the second communication network, allowing, by the processor, the second communication module to register with the endpoint adapter such that the second media type can be added to the communication session.

2. The method of claim 1, wherein the endpoint adapter presents the first and second communication modules to an enterprise network as a single device and wherein the second media type is added to the communication session without disrupting the communication session.

3. The method of claim 2, wherein the endpoint adapter transmits a re-INVITE to communication devices within the enterprise network to transition the communication session to the second communication module.

4. The method of claim 1, wherein the first communication network comprises at least one of a cellular network and a Public Switched Telephone Network (PSTN) and wherein the first media type comprises voice.

5. The method of claim 4, wherein the second media type comprises video.

6. The method of claim 4, wherein the second communication network comprises a data network.

7. The method of claim 6, wherein the second addressing schema uses at least one of Internet Protocol (IP) addresses and Session Initiation Protocol (SIP) addresses to contact the communication device and wherein the second media type comprises video.

8. The method of claim 1, wherein the second media type is added by sending one or more re-INVITE messages to devices already involved in the communication session.

9. The method of claim 8, wherein the one or more re-INVITE messages are transmitted to one or more Back-to-Back User Agents (B2BUAs) that are sequenced into a signaling path of the communication session.

10. The method of claim 1, further comprising:
in response to determining that the communication device has moved within communication proximity of the second communication network, providing a user of the communication device with a query as to whether or not the user wants to add the second media type to the communication session.

11. The method of claim 1, further comprising:
analyzing one or more rules in a rules engine that define communication preferences of a user of the communication device;
in response to determining that the communication device has moved within communication proximity of the second communication network and based on an analysis of the one or more rules, automatically registering the second communication module with the endpoint adapter.

12. A non-transitory computer readable medium having stored thereon instructions that cause a computing system to execute a method, the instructions comprising:
instructions that cause a processor to register a first communication module of a communication device with an endpoint adapter, the first communication module registering with the endpoint adapter via a first communication network that uses a first addressing schema to contact the communication device;

instructions that cause a processor to enable a communication session to occur while the first communication module is registered with the endpoint adapter, the communication session utilizing a first media type that is supported by the first communication network;

instructions that cause a processor to register a second communication module of the communication device with the endpoint adapter, the second communication module registering with the endpoint adapter via a second communication network that uses a second addressing schema to contact the communication device;

instructions that cause a processor to, after the second communication module has registered with the endpoint adapter, add a second media type to the communication session via the second communication module while the communication session is in-progress, wherein the second media type comprises a media type not supported by the first communication network, wherein the communication session is initiated when the communication device is within communication proximity of the first communication network and not within communication proximity of the second communication network;

instructions that cause a processor to determine that the communication device has moved within communication proximity of the second communication network; and instructions that cause a processor to, after determining that the communication device has moved within communication proximity of the second communication network, allow the second communication module to, register with the endpoint adapter such that the second media type can be added to the communication session.

13. The computer readable medium of claim 12, wherein the endpoint adapter presents the first and second communication modules to an enterprise network as a single device and wherein the second media type is added to the communication session without disrupting the communication session.

14. The computer readable medium of claim 13, wherein the endpoint adapter transmits a re-INVITE to communication devices within the enterprise network to transition the communication session to the second communication module.

15. The computer readable medium of claim 13, wherein the first communication network comprises at least one of a cellular network and a Public Switched Telephone Network (PSTN), wherein the first media type comprises voice, and wherein the first communication network is unable to support the second media type.

16. The computer readable medium of claim 12, wherein the second media type is added by sending one or more re-INVITE messages to devices already involved in the communication session.

17. The computer readable medium of claim 16, wherein the one or more re-INVITE messages are transmitted to one or more Back-to-Back User Agents (B2BUAs) that are sequenced into a signaling path of the communication session.

18. The computer readable medium of claim 12, wherein the communication session is initiated when the communication device is within communication proximity of the first communication network and not within communication proximity of the second communication network, the instructions further comprising:

instructions configured to determine that the communication device has moved within communication proximity of the second communication network;

instructions configured to, after determining that the communication device has moved within communication proximity of the second communication network, allow the second communication module to register with the endpoint adapter such that the second media type can be added to the communication session.

19. An enterprise communication network, comprising:
a processor, and
an endpoint adapter that cause the processor to have a first and second communication module of a communication device register therewith and present the first and second communication modules to a network backend as a single communication device even though each communication module registers with the endpoint adapter via different communication networks, the endpoint adapter further causing the processor to facilitate a communication session between the first communication module and a second communication device connected to the enterprise network and then add a new media type to the communication session by the processor transitioning the communication session to the second communication module, wherein the new media type comprises a media type not supported by a communication network which is used by the first communication module, and wherein the endpoint adapter transmits a re-INVITE to communication devices within the enterprise network to transition the communication session to the second communication module.

20. The network of claim 19, wherein the second communication device is connected to the enterprise network via a network boundary device and wherein the network boundary device views the first and second communication modules as a single communication device.

* * * * *